(12) United States Patent
Chen et al.

(10) Patent No.: US 10,673,735 B2
(45) Date of Patent: Jun. 2, 2020

(54) MULTIPLE TOPOLOGY-TRANSPARENT ZONES HAVING A COMMON EDGE NODE

(71) Applicant: Futurewei Technologies, Inc., Plano, TX (US)

(72) Inventors: Huaimo Chen, Bolton, MA (US); Renwei Li, Fremont, CA (US)

(73) Assignee: Futurewei Technologies, Inc., Plano ( * ) Notice: Subject to any disclaimer, the term of this patent is extended or adjusted under 35 U.S.C. 154(b) by 0 days.

(21) Appl. No.: 16/231,063

(22) Filed: Dec. 21, 2018

(65) Prior Publication Data

US 2019/0116113 A1 Apr. 18, 2019

Related U.S. Application Data

(63) Continuation of application No. 15/656,363, filed on Jul. 21, 2017, now Pat. No. 10,164,865, which is a continuation of application No. 14/745,683, filed on Jun. 22, 2015, now Pat. No. 9,716,647.

(51) Int. Cl.
*H04L 12/751* (2013.01)
*H04L 29/06* (2006.01)
*H04L 12/715* (2013.01)
*H04L 12/24* (2006.01)

(52) U.S. Cl.
CPC ............. *H04L 45/02* (2013.01); *H04L 41/12* (2013.01); *H04L 45/04* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 8,964,732 B2 | 2/2015 | Li et al. | |
| 9,319,302 B2 | 4/2016 | Chen | |
| 2007/0206605 A1 | 9/2007 | Ansari et al. | |
| 2012/0243443 A1 | 9/2012 | Li et al. | |
| 2013/0089005 A1 | 4/2013 | Li et al. | |
| 2013/0254195 A1 | 9/2013 | Chen | |
| 2014/0241372 A1 | 8/2014 | Chen et al. | |
| 2014/0254427 A1 | 9/2014 | Chen et al. | |
| 2015/0023150 A1 | 1/2015 | Chen et al. | |

(Continued)

OTHER PUBLICATIONS

RFC2328 J. Moy,"OSPF Version 2",Ascend Communications, Inc. ,dated Apr. 1998,total 244 pages.

(Continued)

*Primary Examiner* — Otis L Thompson, Jr.
(74) *Attorney, Agent, or Firm* — James Anderson Harrison

(57) ABSTRACT

The system and method of the present disclosure relates to technology for a network system supporting multiple topology transparent zones (TTZs) on an edge node. TTZs have a topology including TTZ nodes consisting of edge nodes and internal nodes connected together by internal links. The edge nodes may also be connected to external nodes outside of the TTZ. The edge node is responsible for generating and distributing link state advertisements (LSAs) to generate virtual paths from the edge node to other edge nodes in each of the TTZs. Each TTZ sharing the edge node and each external node neighboring one of the other edge nodes of the TTZs is virtualized by distribution of the LSAs. However, the internal topology of each TTZ is concealed from each of the other TTZs sharing the edge node and from any neighboring external node connected to one of the other edge nodes.

23 Claims, 16 Drawing Sheets

(56) References Cited

U.S. PATENT DOCUMENTS

2015/0117265 A1  4/2015 Li et al.
2016/0112265 A1  4/2016 Chen et al.
2016/0248659 A1  8/2016 Chen et al.

OTHER PUBLICATIONS

RFC1142 David Oran,"OSI IS-IS Intra-domain Routing Protocol",dated Feb. 1990,total 157 pages.

H. Chen et al.,"OSPF Topology-Transparent Zone draft-chen-ospf-ttz-00.txt",Huawei Technologies et al.,dated Oct. 24, 2011,total 20 pages.

H. Chen et al.,"OSPF Topology-Transparent Zone draft-chen-ospf-ttz-01.txt",Huawei Technologies et al.,dated Mar. 12, 2012,total 22 pages.

ISO/IEC 10589 Information technology—Telecommunications and information exchange between systems—Intermediate system to Intermediate system intra-domain routeing information exchange protocol for use in conjunction with the protocol for providing the connectionless-mode Network Service (ISO 8473),International Standard,dated Apr. 30, 1992,total 155 pages.

MULTIPLE TOPOLOGY-TRANSPARENT ZONES HAVING A COMMON EDGE NODE

CROSS-REFERENCE TO RELATED APPLICATIONS

This application is a continuation of U.S. patent application Ser. No. 15/656,363, filed on Jul. 21, 2017, which is a continuation of U.S. patent application Ser. No. 14/745,683, filed on Jun. 22, 2015, by Huaimo Chen et al., and entitled "MULTIPLE TOPOLOGY-TRANSPARENT ZONES HAVING A COMMON EDGE NODE," all of which are incorporated herein by reference as if reproduced in their entirety.

BACKGROUND

As more and more nodes (e.g., routers) are added into a conventional communications network, the size of the network increases, and issues such as scalability and slow convergence may arise. In communication networks such as the Internet, an autonomous system (AS) may have a common routing policy (either in a single network or in a group of networks) that is controlled by a network administrator (or group of administrators on behalf of a single administrative entity, such as a university, a business enterprise, or a business division). Within the Internet, an AS comprises a collection of routers exchanging routing information via a common routing protocol. Each AS on the Internet may be assigned a globally unique number, which is sometimes called an AS number (ASN).

In a network comprising a single autonomous system (AS) with a single area, each node needs to be aware of the positional relationships (i.e., adjacencies) of all other nodes, such that all nodes may build a topological map (topology) of the AS. Nodes may learn about one another's adjacencies by distributing (i.e., flooding) link-state information throughout the network according to one or more interior gateway protocols (IGPs) including, but not limited to, open shortest path first (OSPF) or intermediate system (IS) to IS (IS-IS). Specifically, nodes engaging in IGPs may distribute their own link state advertisements (LSAs) describing their own adjacencies to all their neighboring nodes, which may forward the received LSAs to all their neighboring nodes (except the node from which the LSA was received). This may allow the LSA to be distributed throughout the network such that all network nodes become aware of one another's adjacencies, thereby allowing the various nodes to build topology graphs (e.g., link state databases (LSDBs)). LSAs may be distributed upon network initialization as well as whenever a network adjacency changes (e.g., a node is added/removed or a node/link fails). A network change may lead to every node in the network having to re-compute a shortest path to each destination, and to update its routing information base (RIB) and its forwarding information base (FIB). Consequently, as more nodes are added to a network, link state distributions and shortest path computations may begin to consume more and more network resources, such as bandwidth and/or processing time.

Through splitting a network into multiple areas, the network may be further extended. However, there are a number of issues when splitting a network into multiple areas. For example, dividing an AS into multiple aSs or an area into multiple areas may involve significant network architecture changes. For another example, it may be complex to setup a multi-protocol label switching (MPLS) traffic engineering (TE) label switching path (LSP) crossing multiple areas. In general, a TE path crossing multiple areas may be computed by using collaborating path computation elements (PCEs) through the PCE communication protocol (PCEP), which may not be easy to configure by operators since manual configuration of the sequence of domains is required. Further, the current PCE method may not guarantee that the path found would be optimal. For yet another example, some policies may need to be reconfigured on ABRs for reducing the number of link states such as summary link-state advertisements (LSAs) to be distributed to other routers in other areas. Thus, as an AS grows larger (e.g., comprising more and more nodes), scalability issues may arise, which may result from, for example, the inability of a large network to quickly compute a shortest path to every destination on each node, and efficiently manage or distribute network topology information. Consequently, larger networks may suffer from slower convergence. For example, larger networks may require a longer period to build or update topology graphs, during which time data may be misdirected or lost. Moreover, re-convergence in large networks may also be an issue, as the inability to timely recover from a fault in a node/link (or some other condition that changes a network adjacency subsequent to initialization) may disrupt network services, such as the traffic transported from node to node along the shortest path.

BRIEF SUMMARY

In one embodiment, there is an area of a network system, including a plurality of topology transparent zones (TTZs), each of the TTZs comprises a plurality of TTZ nodes including one or more edge nodes and one or more internal nodes, and each of the one or more internal nodes is configured to connect to another one or more of the TTZ nodes via one or more internal links within a respective TTZ; a plurality of neighboring external nodes respectively connected to the one or more edge nodes via a plurality of external links; and a common edge node supporting at least two TTZs of the plurality of TTZs and generating virtual paths from the common edge node to the one or more edge nodes in the at least two TTZs, and generating link state advertisements (LSAs) describing the one or more internal links in a respective one of the at least two TTZs, wherein the one or more internal links are concealed from the plurality of neighboring external nodes and each of the other TTZs.

In another embodiment, there is a method of virtualizing topology transparent zones (TTZs) in an area of a network system, including identifying an internal topology of one or more TTZs, each of the TTZs including a plurality of TTZ nodes, wherein the plurality of TTZ nodes has one or more edge nodes and one or more internal nodes and each of the TTZ nodes is configured to connect to another TTZ node via one or more internal links; generating one or more virtual paths in the one or more TTZs from a common edge node, the virtual paths comprising one or more first links from the common edge node to each of the other edge nodes in one of the one or more TTZs and one or more second links from the common edge node to each of the other edge nodes in another of the one or more TTZs, wherein each of the other edge nodes have an external link to a neighboring external node; and concealing the internal topology of each of the one or more TTZs from another one of the one or more TTZs and from the neighboring external nodes, wherein the common edge node is shared by two or more of the TTZs.

In still another embodiment, there is a router located in an area having multiple topology transparent zones (TTZs), including a first port configured to connect to a first neighboring router in a first TTZ via a first link; a second port configured to connect to a second neighboring router in a second TTZ via a second link; and a processor, connected to the first and second ports, configured to generate virtual paths by sending a first link state advertisements (LSA) to each node connected to the router, one or more second LSAs each of which is distributed to a respective TTZ and a third LSA to external nodes connected to the router.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

The present disclosure, generally described, relates to technology for a network system having multiple topology transparent zones (TTZs) supported by an edge node, herein referred to as a common edge node. Each of the TTZs has a topology that include TTZ nodes consisting of edge nodes and internal nodes that are connected together by internal links. The edge nodes, including the common edge node, of a TTZ may also be connected to external nodes residing outside of the TTZ via an external link. The common edge node is responsible for generating and distributing a series of link state advertisements (LSAs) to generate virtual links or paths from the common edge node to other edge nodes in each of the TTZs sharing the common edge node. Each TTZ topology sharing the common edge node is virtualized to a node outside of the TTZ by distribution of the LSAs to the node. However, the internal topology of each TTZ is concealed from each of the other TTZs sharing the common edge node and from any neighboring external node connected to an edge node of the TTZs. The ability of the system to support multiple TTZs on a common edge node provides scalability, increased network availability, reduced cost of operation and maintenance of networks and smooth migration to zones without service interruption.

Figure 1:
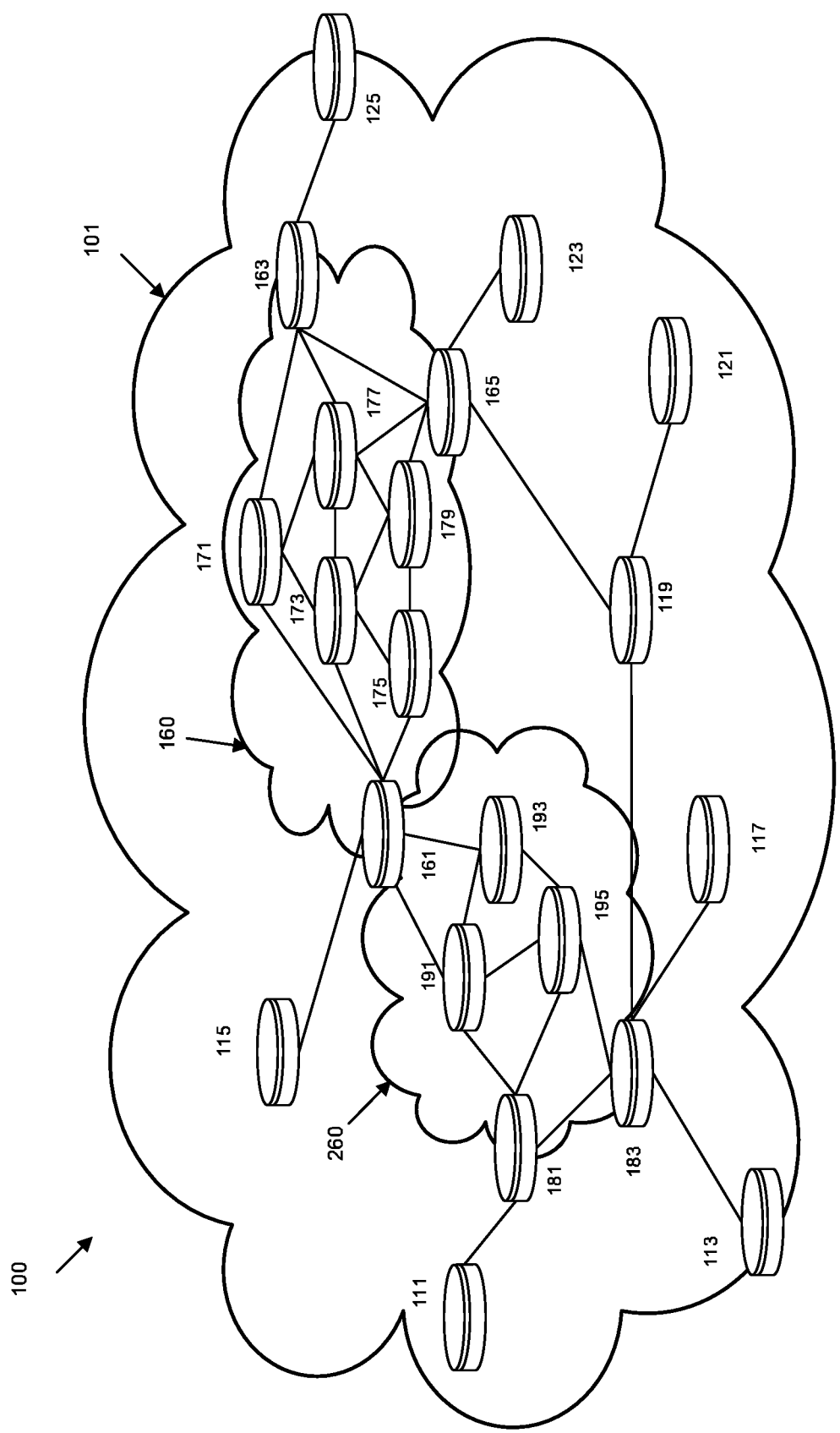
FIG. 1 is an exemplary embodiment illustrating a network system with multiple topology transparent zones.

FIG. 1 is an exemplary diagram of a network system in an area having multiple TTZs. The network system 100 comprises an area 101, such as an Open Shortest Path First (OSPF) area, having two topology transparent zones (TTZs) 160 and 260. The area 101 also includes area border nodes, including a first area border node 113 and a second area border node 125, one or both of which may be connected to another OSPF area (not shown). An area border node may be, for example, an area border router (ABR).

The area 101 may also include internal nodes, such as internal nodes (or TTZ internal nodes) 111, 115, 117, 119, 121 and 123, which are not connected to a node outside of the area 101. While only a single area is illustrated in the figure, the skilled artisan will understand that the system may include any number of areas which may or may not be connected to one another. Likewise, more than two TTZs may be part of the area. Thus, a TTZ, as disclosed herein, may be configured in an area, such as area 101 of the network system, and includes one or more TTZ nodes including at least one edge node and at least one internal node. The TTZ may also include a number of internal links between internal and/or edge nodes, and the edge nodes may be connected to a number of nodes outside of the TTZ, which are referred to herein as external nodes, via a number of external links. The links may be any type of electrical or optical link for transporting data. Information regarding the external nodes and the external links are distributed or flooded to each TTZ node. It is also appreciated that the TTZ nodes may be devices, such as transceivers, routers, modems, etc. that may switch data in a deterministic manner throughout the network system 100.

Each node may also include one or more tables (for example, LSDB, RIB and FIB tables) containing link state information (LSA) that describes the topology of the network system 100, and is described below in more detail. It is appreciated that the nodes may be any computing device or component as understood by the skilled artisan, and is not limited to the disclosed embodiments.

In the illustrated embodiment, the TTZ 160 comprises edge nodes 161, 163 and 165, each of which is connected to one or more nodes located outside of the TTZ 160. For example, edge node 161 is an edge node of TTZ 160 since it is connected to an external node, such as external node 115, outside of TTZ 160. Nodes connected to an edge node outside of a TTZ are herein referred to as external nodes. In addition, the TTZ 160 comprises a plurality of internal nodes 171, 173, 175, 177 and 179. An internal node may be connected to other internal nodes inside TTZ 160, but is not connected to any node outside of the TTZ 160.

Similarly, TTZ 260 comprises edge nodes 181, 183 and 161, each of which is connected to one or more nodes located outside of the TTZ 260. For example, edge node 181 is an edge node of TTZ 260 since it is connected to an external node, such as external node 111, outside of TTZ 260 in one embodiment. In addition, the TTZ 260 includes multiple TTZ internal nodes 191, 193 and 195, which may be connected to each other but are not connected to any node outside of the TTZ 260. The internal links, the internal nodes and the edge nodes of any one TTZ together form an internal topology of the TTZ. An internal topology of the TTZ is also called a topology of the TTZ.

The topology for a TTZ may be established using an LSA in which a TTZ's LSA describes its own adjacencies to all neighboring nodes in the TTZ. The LSA, upon distribution to and receipt from a neighboring node, may be forwarded by the receiving neighboring node to all other neighboring nodes (excluding the forwarding node) in the TTZ, thereby permitting the LSA to be distributed throughout the TTZ such that all network nodes in the TTZ become aware of all other network nodes in the TTZ. Thus, for example, an LSA comprising local link state information relevant to the TTZ 160 may be distributed (e.g., flooded) to all the nodes 161-179 within the TTZ 160 (although in the disclosed embodiments that follow, not to internal nodes located in other TTZs, such as the nodes 191-195 in the TTZ 260). To identify or classify a link as internal, a TTZ may use a TTZ identifier (TTZ ID) similar in form to a router ID. Thus, upon completion of links being configured between all nodes with the same TTZ ID on both sides of the link (i.e., on both nodes at each end of the link), the topology of the TTZ (e.g., TTZ 160 and TTZ 260) is formed. For example, with respect to TTZ 160, eight nodes 161, 163, 165, 171, 173, 175, 177 and 179, and fifteen links connecting the eight nodes, form the TTZ 160. The complete topology for area 101, including TTZs 160 and 260 is represented by the diagram in FIG. 1, showing links to each TTZ node.

Figure 3:
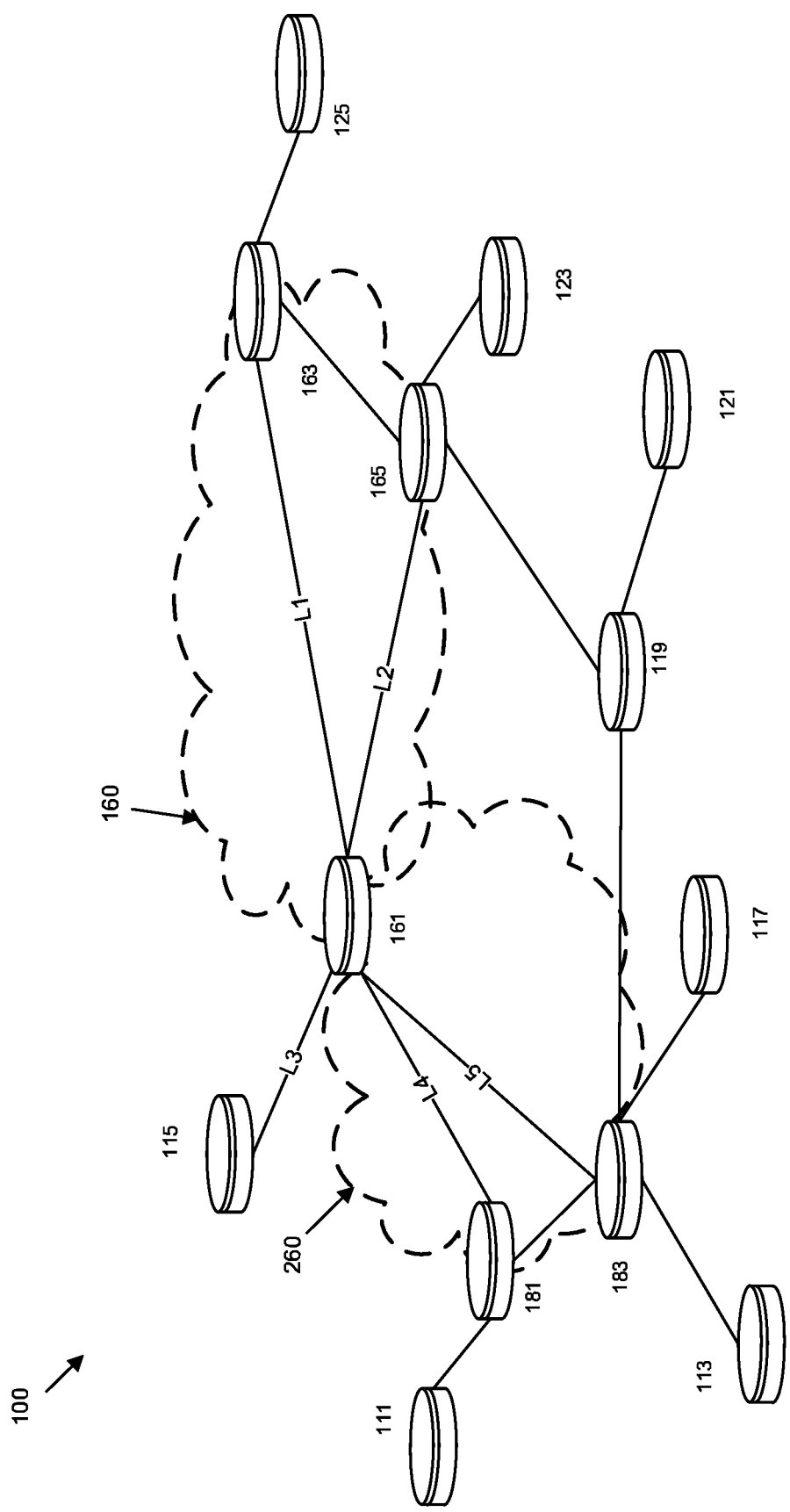
FIG. 3 is an exemplary embodiment illustrating virtual links formed between edge nodes in the system of FIG. 1.

It is also understood that while the described embodiments discuss a single LSA, the edge nodes, including the common edge node, may be configured to generate one or more LSAs describing one or more links, such as a first link, a second link, etc. In one exemplary embodiment, a first LSA is sent to one neighboring external node, while a second LSA may describe a first link and one or more additional links between an edge node and other edge nodes of the TTZs. Some or all of the additional links may be virtual links or paths, each of which indicates an indirect connection between two edge nodes, such as the virtual path L1 indirectly connecting edge node 161 and the edge node 163 (FIG. 3). In one embodiment, a cost of a link between two edge nodes may be the cost of the shortest path between the two edge nodes. In another embodiment, a forwarding adjacency may be established between every two edge nodes (i.e., a pair of edge nodes), and a cost of a link between the two edge nodes may be set to a predetermined or fixed value, such as about one. A more detailed explanation of an LSA is described below with reference to FIGS. 7-9.

Figure 2:
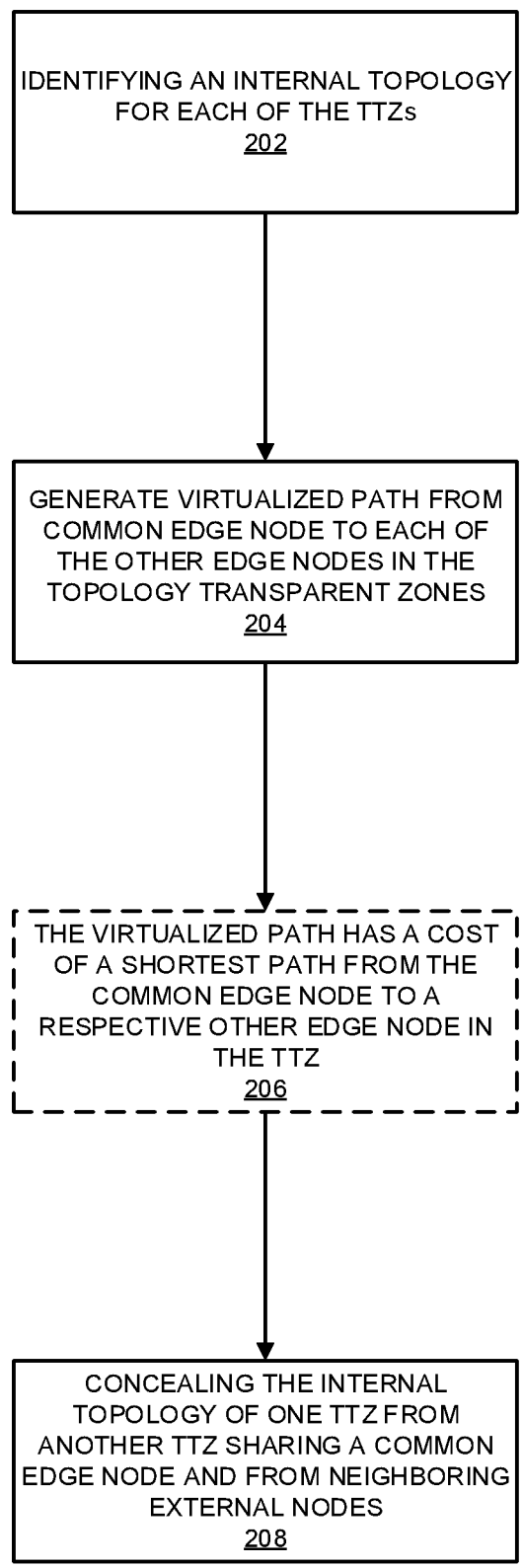
FIG. 2 is an exemplary flow chart of virtualizing a topology transparent zone in the system of FIG. 1.

FIG. 2 is an exemplary flow chart of virtualizing a topology transparent zone in the system of FIG. 1. The flow chart in FIG. 2 will be described with reference to FIG. 3, which illustrates an exemplary embodiment of virtual paths in the TTZs. In the embodiments described herein, the common edge node 161 is responsible for computing and processing data. However, it is appreciated that any node may be employed to implement the disclosed processes, including but not limited to an external node or processing system. At 202, the common edge node 161 identifies the internal topology for each of the TTZs. In the embodiment disclosed in FIG. 1, the common edge node 161 identifies the internal topology for TTZ 160 (first internal topology) to include internal nodes 171, 173, 175, 177 and 179 and edge nodes 161, 163 and 165, and the internal topology for TTZ 260 (second internal topology) to include internal nodes 191, 193 and 195 and edge nodes 161, 181, 183. The common edge node 161 may identify the first and second internal topologies since it is an edge node of each TTZ. The common edge node 161 may also identify the first and second internal topologies if another TTZ node distributes one or more LSAs that describes the first and second internal topologies. Thus, the first and second topologies may provide the common edge node 161 with an identifying set of links that connect the nodes within a respective TTZ, thereby revealing the topologies. This set of links for purposes of discussion will be deemed the original set of links or original internal topology (e.g., links in the TTZ prior to virtualizing a TTZ, described below). It is also appreciated that while the common edge node 161 identifies the topologies in the exemplary embodiments, any other edge node in the TTZ may also be responsible for such identification.

Figure 9:
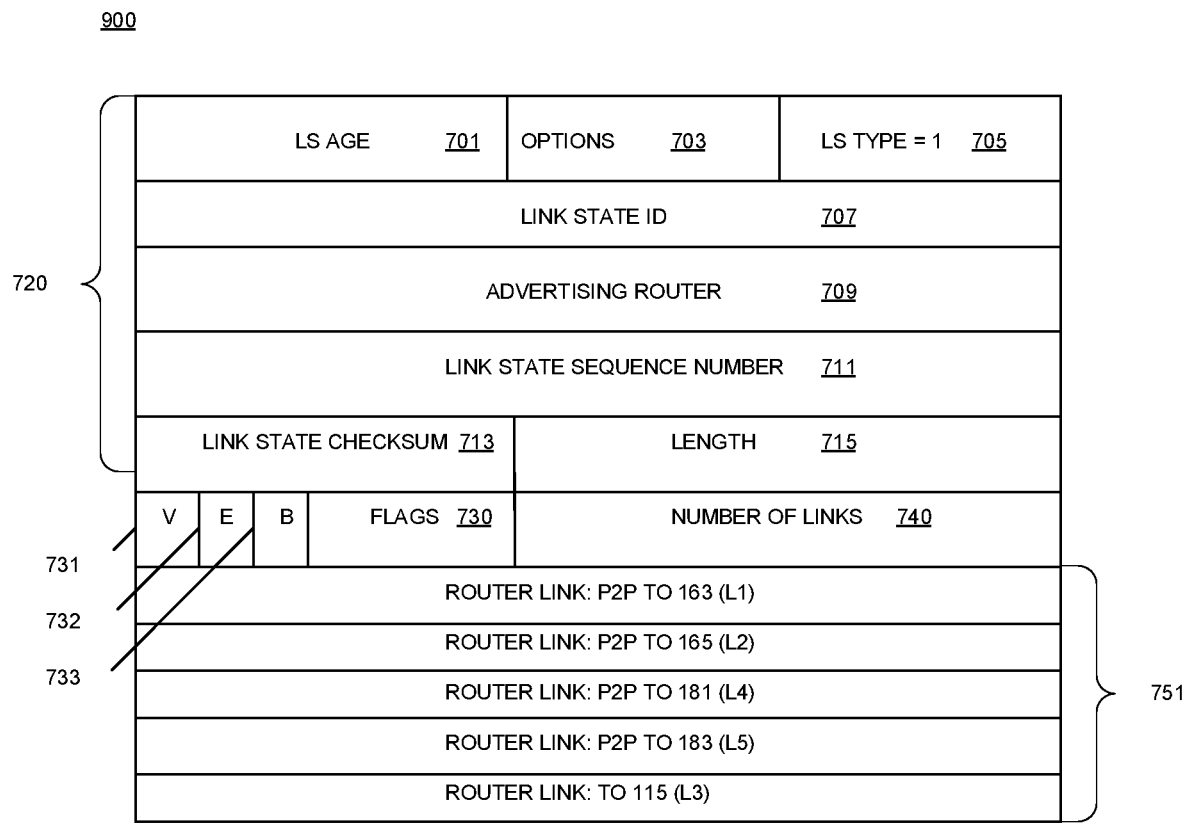
FIG. 9 illustrates an exemplary embodiment of a router LSA in which router links are identified.

Next, the common edge node 161 generates a virtual path from the common edge node 161 to each of the other edge nodes within one or more TTZs of which the edge node is a part, and which has a neighboring external node, in order to virtualize the one or more TTZs, at 204. For example, in the disclosed embodiment, common edge node 161 supports TTZ 160 and TTZ 260. Thus, common edge node 161 generates a virtual path from common edge node 161 to edge node 163 (having neighboring external node 125) in TTZ 160 (via link L1). Common edge node 161 also generates a virtual path from common edge node 161 to edge node 165 (having neighboring external node 123) in TTZ 160 (via link L2). Common edge node 161 then generates a virtual path from common edge node 161 to edge node 181 (having neighboring external node 111) in TTZ 260 (via link L4) and from common edge node 161 to edge node 183 (having neighboring external node 113), in TTZ 260 (via link L5). The common edge node 161 may use an LSA to generate the virtual paths L1, L2, L4 and L5 by describing the links as part of the link state information in the LSA. In the exemplary embodiments, each of the virtual paths L1, L2, L4 and L5 is described as a point-to-point link (P2P) connection from edge node to edge node. The LSA will also include a normal link from common edge node 161 to any neighboring external node, such as neighboring external node 115 (via link L3). FIG. 9, described in more detail below, illustrates an LSA generated by the common edge node 161 in the exemplary embodiment. In one optional embodiment, a cost of a link between two edge nodes may be the cost of the shortest path between the two edge nodes (206).

Once the virtual paths have been described in an LSA for the TTZs 160 and 260 and the LSA is distributed to external neighboring nodes outside of the TTZs, the internal topologies of each TTZ are hidden or concealed by the common edge node 161 from the neighboring external nodes, at 208. For example, the TTZ 160 may conceal the information inside (i.e., the internal topology, including internal nodes and internal links) of TTZ 160 from neighboring external node (e.g. neighboring external node 115). Concealment of the internal topology is accomplished by distribution of the generated LSAs describing the P2P links and normal link to neighboring external nodes of the common edge node 161.

For example, to conceal the internal topologies from outside of TTZ 160 and TTZ 260, a generated LSA by common edge node 161 describes links from common edge node 161 as: P2P link to edge node 163 (lint L1), P2P link to edge node 165 (link L2), P2P link to edge node 181 (link L4), P2P link to edge node 183 (link L5) and link to neighboring external node 115 (link L3). The links described by the LSA are illustrated, for example, in FIG. 3.

In one exemplary embodiment, the TTZ ID may be configured on a link between two TTZ nodes, which indicates the link is inside the TTZ or enables the link as a TTZ link. For example, TTZ ID 160 may be configured on the link between common edge node 161 and internal node 171 to indicate that the link (L1) is inside of the TTZ 160 from the perspective of common edge node 161. Similarly, TTZ ID 160 may be configured on the internal node 171 of TTZ 160 on the link (L1) between internal node 171 and common edge node 161. Internal nodes of TTZ 260 are similarly identified and classified. Thus, a TTZ may also be defined by all of the nodes having the same TTZ ID value and TTZ links.

As described above, external nodes that neighbor an edge node in a TTZ are concealed from viewing the internal topology of that TTZ. The following example is made with reference to FIG. 3, which illustrates an exemplary embodiment of virtual links formed between edge nodes in the system of FIG. 1. External node 125 (located outside of the TTZ 160) is connected to the TTZ 160 through edge node 163. Thus, external node 125 views the TTZ 160 as a group of TTZ edge nodes, namely edge nodes 161, 163 and 165 fully connected, in which there is a normal P2P connection (link L1 in FIG. 3) between node 161 and 163, a normal P2P connection (link L2 in FIG. 3) between node 161 and 165, and a normal P2P connection between node 163 and 165. The external node 125 is not aware of any TTZs since the links among node 161, 163 and 165 are normal links. In addition, the external node may view each of the edge nodes 161, 163 and 165 as having a normal connection to other external nodes. For example, external node 125 views the edge nodes 161, 163 and 165 as having connections in which common edge node 161 has a normal connection to external node 115, edge node 163 has a normal connection to external node 125, and edge node 165 has a normal connection to nodes 119 and 123. This also holds true for the external nodes that neighbor TTZ 260. Accordingly, from the perspective of an external node, a TTZ may be viewed as a group of connected TTZ edge nodes, without having any knowledge of the internal nodes or topology.

Figure 4A:
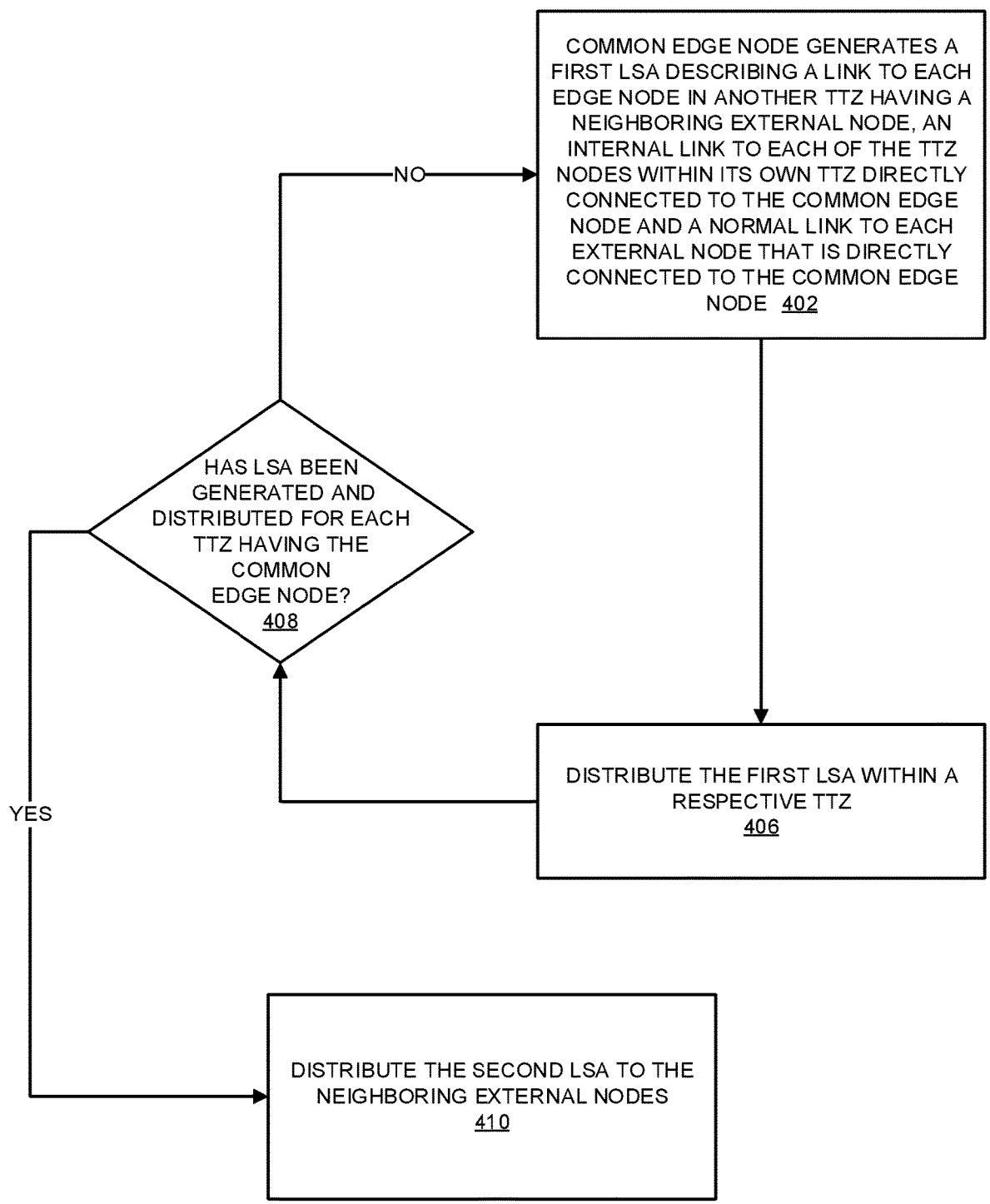
FIG. 4A is an exemplary flow chart of virtualizing topology transparent zones in the system of FIG. 1.
Figure 4B:
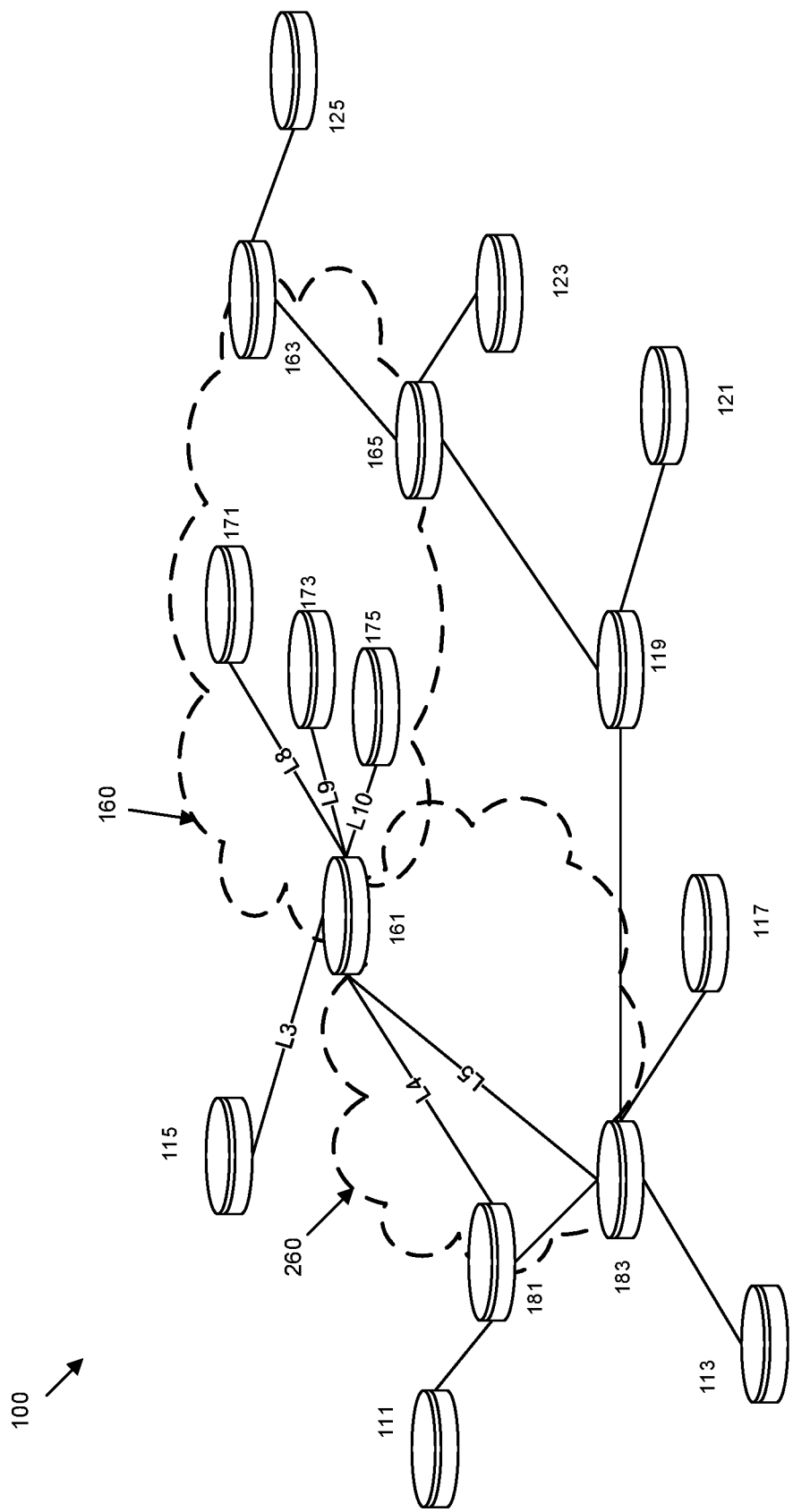
FIG. 4B is an exemplary embodiment illustrating virtual links formed in multiple topology transparent zones in accordance with FIG. 4A.
Figure 4C:
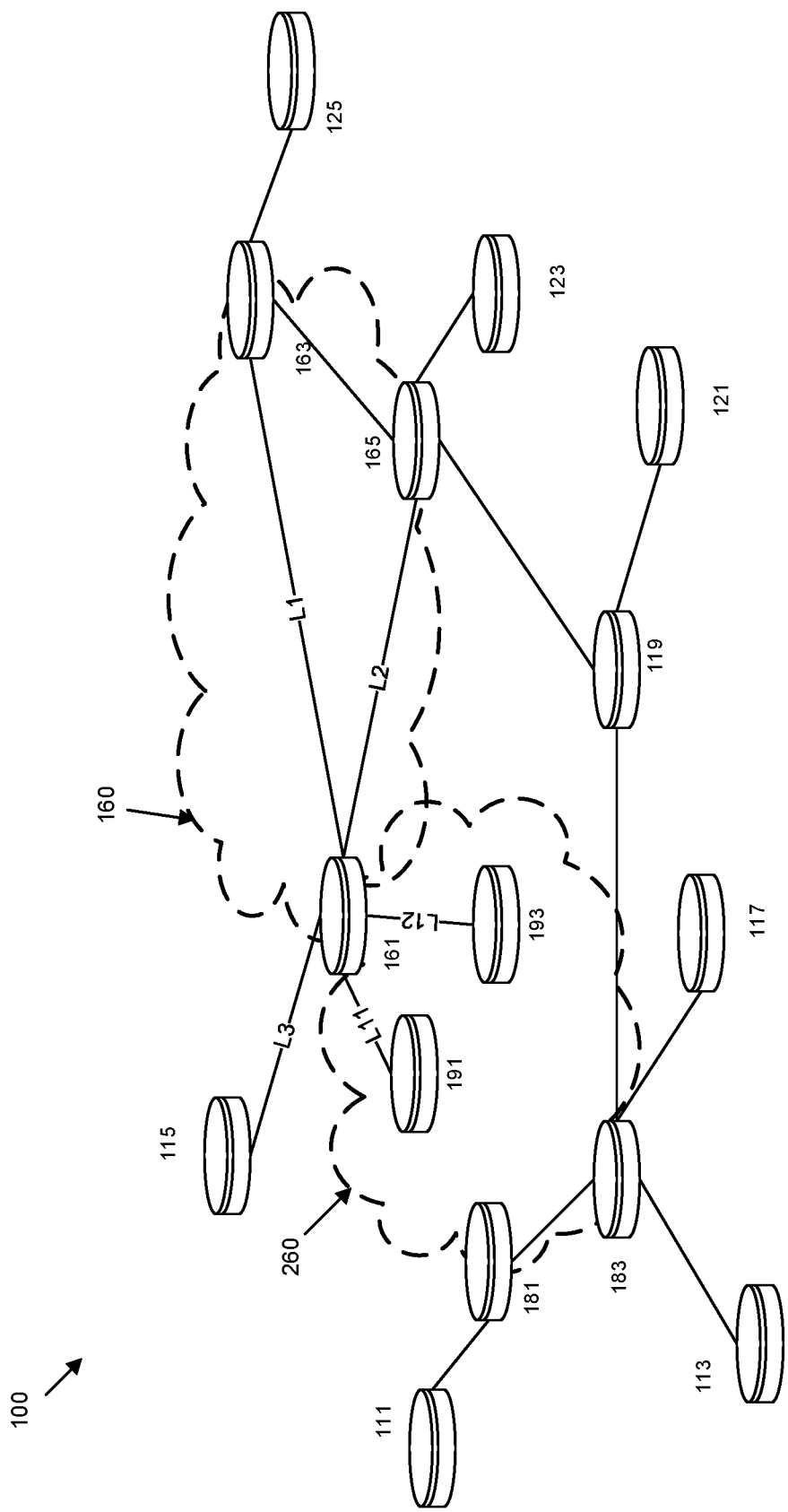
FIG. 4C is another exemplary embodiment illustrating virtual links formed in multiple topology transparent zones in accordance with FIG. 4A.

FIG. 4A is an exemplary flow chart of virtualizing a topology transparent zone in the system of FIG. 1. The flow chart in FIG. 4A will be described with reference to FIGS. 4B and 4C, which illustrate exemplary embodiments of virtual links formed between multiple topology transparent zones in the system of FIG. 1. At 402, and with reference to FIG. 4B, the common edge node 161 generates a first LSA for one TTZ that describes a link to each edge node in another TTZ having a neighboring external node. For example, for TTZ 160, the common edge node 161 generates a link from common edge node 161 to edge nodes 181 (link L4) and 183 (link L5) in TTZ 260. The common edge node 161 also generates, as part of the first LSA, an internal link to each of the TTZ nodes within its own TTZ (e.g., internal nodes of TTZ 160) that is directly connected to the common edge node 161. For example, the common edge node 161 generates a link from common edge node 161 to each of internal nodes 171 (link L8), 173 (link L9) and 175 (link L10). In addition, the common edge node 161 generates, as part of the first LSA, a normal link to each external node directly connected to it. For example, the common edge node 161 generates a link from common edge node 161 to external node 115 (link L3). The first LSA generated for one TTZ (e.g., TTZ 160) is distributed within the TTZ (e.g., TTZ 160), and is not distributed to any node outside of the TTZ (e.g., TTZ 160). Similarly, for TTZ 260, and with reference to FIG. 4C, the common edge node 161 generates another first LSA for one TTZ (e.g., TTZ 260) that describes a link to each edge node in another TTZ (e.g., TTZ 160) having a neighboring external node. For example, for TTZ 260, the common edge node 161 generates a link from common edge node 161 to edge nodes 163 (link L1) and 165 (link L2) in TTZ 160.

The common edge node 161 also generates, as part of the first LSA, an internal link to each of the TTZ nodes within its own TTZ (e.g., internal nodes of TTZ 260) that is directly connected to the common edge node 161. For example, the common edge node 161 generates a link from common edge 161 to each of internal nodes 191 (link L11) and 193 (link L12). In addition, the common edge node 161 generates, as part of the first LSA, a normal link to each external node directly connected to it. For example, the common edge node 161 generates a link from common edge node 161 to external node 115 (link L3). The first LSA generated for one TTZ (e.g., TTZ 260) is distributed within the TTZ (e.g., TTZ 260), and is not distributed to any node outside of the TTZ (e.g., TTZ 260). In one embodiment, the LSA describes a loopback address (e.g., a destination address) inside of a TTZ as a stub link with associated cost of the link, which is the cost of a shortest path to the address. In such an embodiment, the internal topology of a TTZ is not revealed.

Following the generation of the first LSA for each of the TTZs, the common edge node 161 distributes the LSAs within a respective TTZ. For example, the first LSA generated for TTZ 160 is distributed in TTZ 160, and the first LSA generated for TTZ 260 is distributed in TTZ 260, at 406. Upon completion of distributing a first LSA, the common edge node 161 determines whether an LSA has been generated and distributed for each of the TTZs sharing the common edge node 161 (or any other common edge node), at 408. If LSAs have not been generated and distributed for all TTZs, then the process of virtualizing the topology returns to 402, and further LSAs are generated and distributed in a similar manner. For example, if another common edge node (not shown) exists in the area, or if additional TTZs (not shown) are connected to common edge node 161, the process continues to virtualize the topologies for each TTZ. If, on the other hand, the common edge node 161 determines at 408 that all first LSAs have been generated and distributed, the common edge node 161 generates and distributes a second LSA to neighboring external nodes at 410. A description of the generated second LSA is found above with reference to FIGS. 2 and 3 and will not be repeated. In one embodiment, the first LSAs and the second LSA may be generated and distributed at the same time.

The first LSAs distributed within a respective TTZ are thus concealed from each of the other TTZs and external nodes. That is, each TTZ views the virtual topology created as a result of the generated and distributed LSAs. For example, the LSA of TTZ 160 describes links from common edge node 161 as: TTZ link to internal node 171 (L8), TTZ link to internal node 173 (L9) and TTZ link to internal node 175 (L10); P2P link to 181 (L4) and P2P link to 183 (L5); and a normal link to external node 115 (L3). Thus, from the perspective of TTZ 160, common edge node 161 and an internal node (e.g., node 175) in TTZ 160 view the edge nodes (181 and 183) of TTZ 260, without identifying the internal nodes 191 and 193. Similarly, the LSA of TTZ 260 describes links from common edge node 161 as: TTZ link to internal node 191 (L11) and TTZ link to internal node 193 (L12); P2P link to 163 (L1) and P2P link to 165 (L2); and a normal link to external node 115 (L3). Thus, from the perspective of TTZ 260, common edge node 161 and an internal node (e.g., 191) in TTZ 260 view the edge nodes (163 and 165) of TTZ 160, without identifying the internal nodes 171, 173 and 175.

Figure 5A:
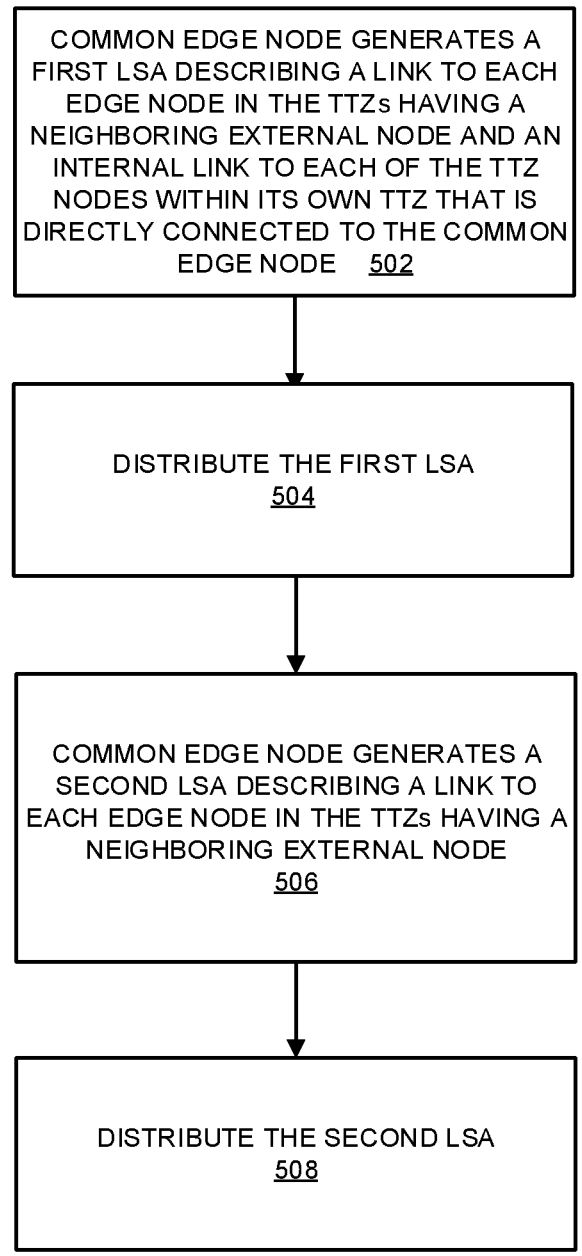
FIG. 5A is an exemplary flow chart of migrating to one topology transparent zone in the system of FIG. 1.

FIG. 5A is an exemplary flow chart of migrating a part of network to one topology transparent zone in the system of FIG. 1. The flow chart in FIG. 5A will be described with reference to FIGS. 5B and 5C, which illustrate exemplary embodiments of virtual links formed between multiple topology transparent zones in the system of FIG. 1 during migrating a part of the network to a TTZ (e.g., migrating the original internal topology of cloud 160 in FIG. 1 to a TTZ). The term cloud refers to any part of the network, such as cloud 160 or 260, in which the internal topology is in an original internal topology (i.e., prior to virtualization). Before migrating the original internal topology of the cloud to TTZ 160, each of the nodes and links in the original internal topology may be viewed by each of the other nodes in the network 100. After migrating the original internal topology of cloud 160 to a TTZ (e.g., TTZ 160), the internal nodes and links of the original internal topology of cloud 160 are hidden or concealed from each of the other nodes, and the virtual paths among the edge nodes of the original internal topology may be viewed by each of the other nodes in the network 100.

Figure 5B:
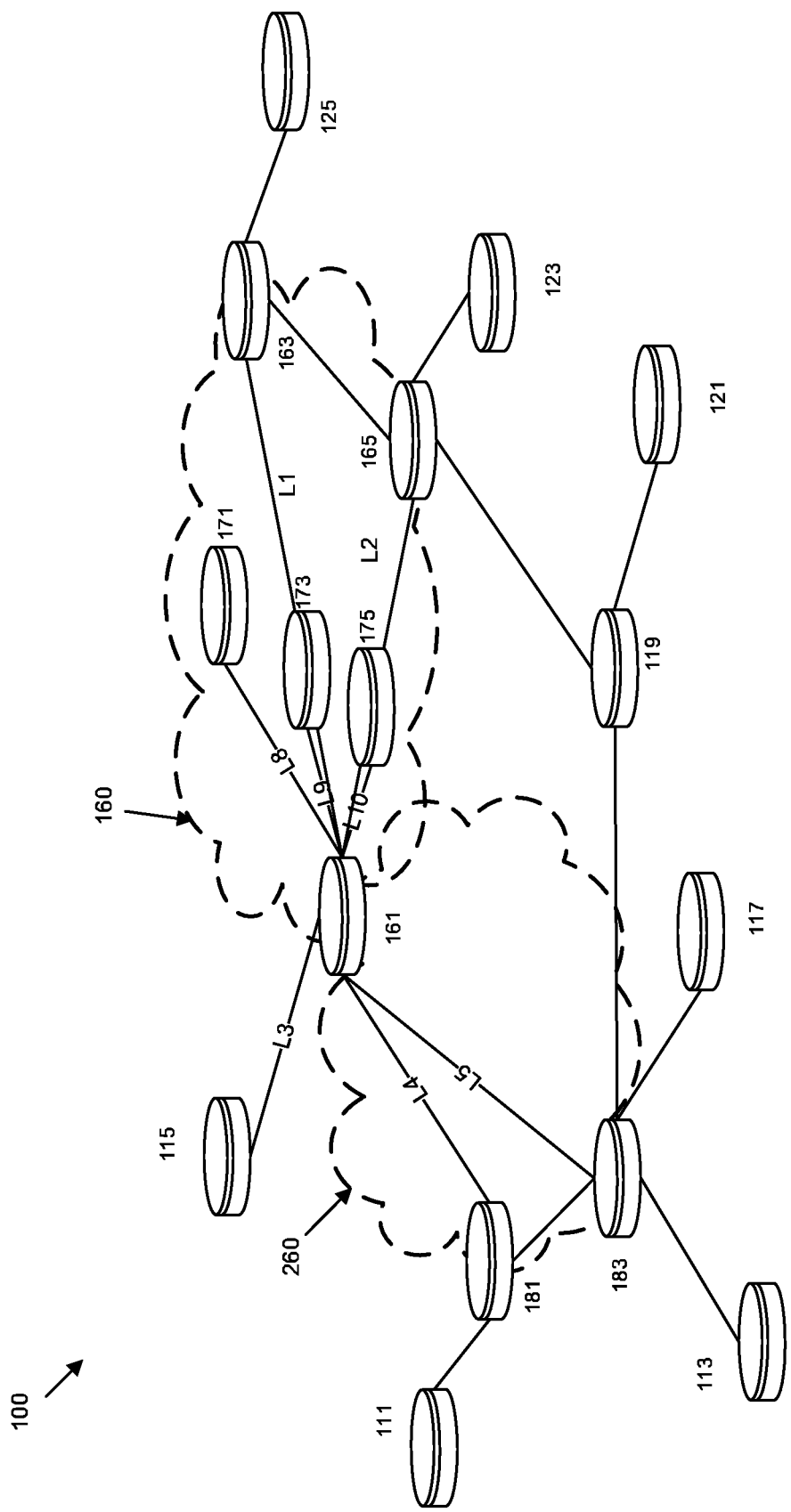
FIG. 5B illustrates exemplary embodiments of virtual links formed in multiple topology transparent zones in accordance with FIG. 5A.

At 502, and with reference to FIG. 5B, the common edge node 161 generates a first LSA for TTZ 160 that describes a link (virtual path) to each edge node in the TTZ having a neighboring external node. For example, the common edge node 161 generates four virtual paths L1, L2, L4 and L5. Following generation of the four virtual paths, the common edge node 161 generates internal links to the internal nodes directly connected to it, for example internal nodes 171, 173 and 175, along links L8, L9 and L10, respectively. Additionally, link L3 is generated to connect external node 115 and common edge node 161. The first LSA is then distributed to a first of the TTZs (e.g., TTZ 160), other TTZs (e.g., TTZ 260) and neighboring external nodes at 504. The first LSA describes links from common edge node 161 as: link to internal node 171 (L8), link to internal node 173 (L9), link to internal node 175 (L10), P2P link to edge node 181 (L4), P2P link to edge node 183 (L5), P2P link to edge node 163 (L1), P2P link to edge node 165 (L2) and link to external node 115 (L3).

Figure 5C:
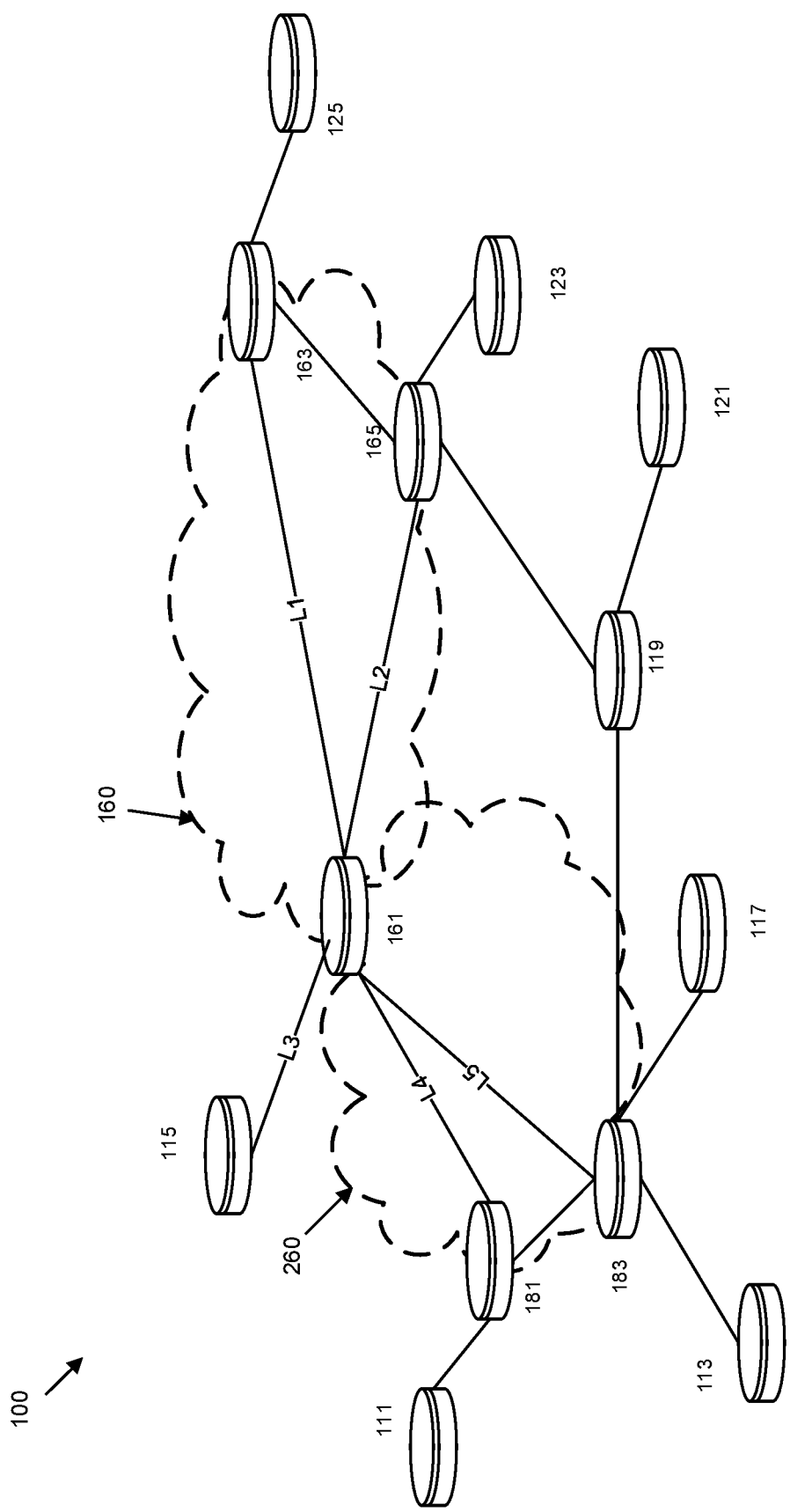
FIG. 5C illustrates exemplary embodiments of virtual links formed in multiple topology transparent zones in accordance with FIG. 5A.

In order to complete the migration, common edge node 161 generates a second LSA to migrate to TTZ 160 such that it describes a link from the common edge node 161 to each of the edge nodes in TTZ 160 and TTZ 260 (FIG. 5C), at 506. The second LSA is distributed by the common edge node 161 at 508. In one embodiment, the second LSA is generated and distributed after the first LSA has been generated and distributed. In another embodiment, the second LSA is generated and distributed after the first LSA generated and distributed by each of the other edge nodes in the TTZ (e.g., TTZ 160) is received for a specified amount of time. In still another embodiment, the second LSA is generated and distributed after the first LSA is generated and distributed for a period of time. A full description of the generation of the virtual paths and links may be found above with respect to FIGS. 2 and 4A, and will not be repeated herein. The second LSA describes links from common edge node 161 as: P2P link to edge node 181 (L4), P2P link to edge node 183 (L5), P2P link to edge node 163 (L1), P2P link to edge node 165 (L2) and link to external node 115 (L3). Once the LSAs have been distributed, the virtual topology for the migrated TTZ 160 is complete. As a result, external nodes outside of the TTZ 160 will view the topology of TTZ 160 as depicted in FIG. 5C. For example, from the perspective of external node 115 connected (via link L3) to common node 161, the topology appears as four links L1, L2, L4 and L5 from the common edge node 161 to edge nodes in TTZ 160 and TTZ 260.

Figure 6A:
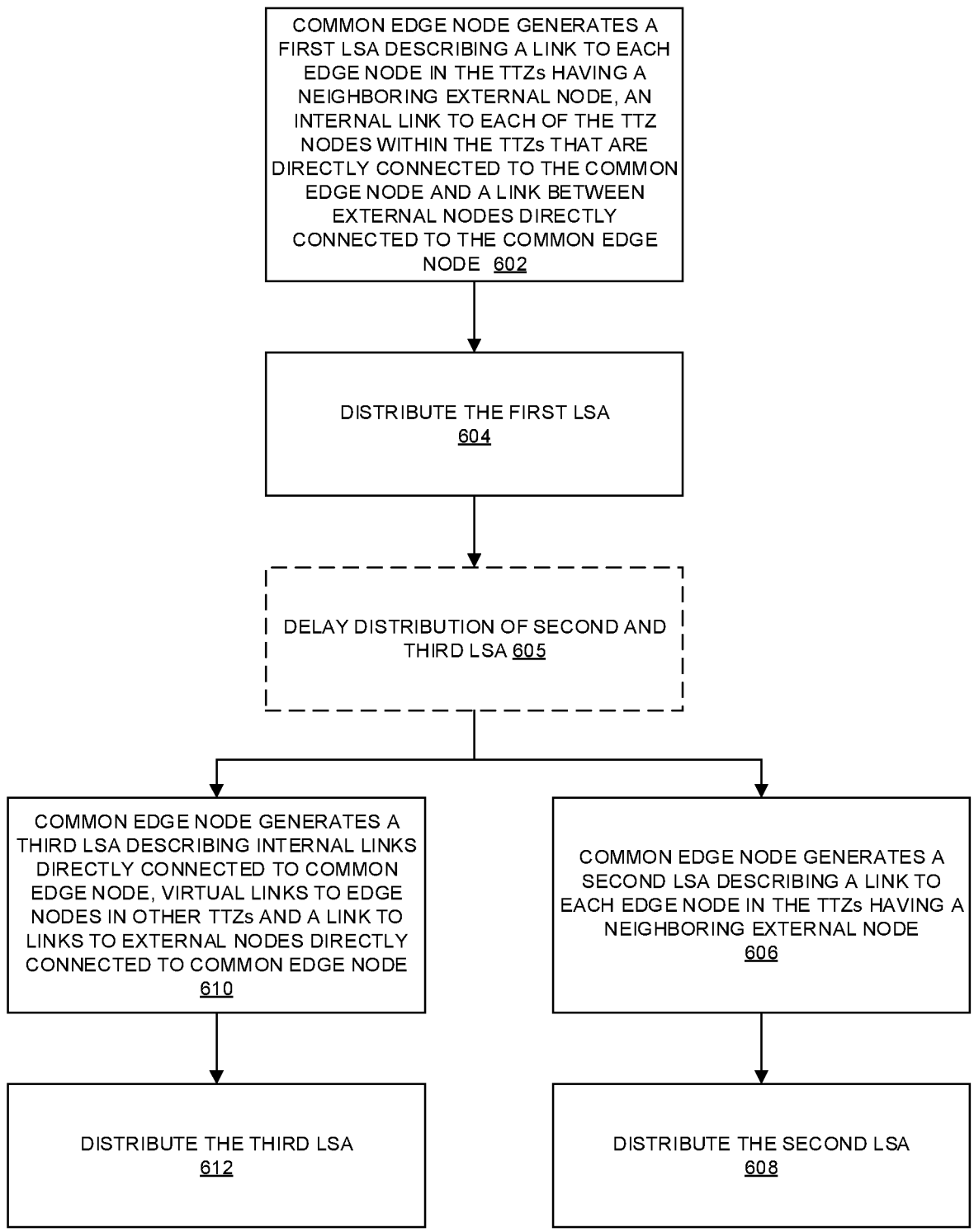
FIG. 6A is an exemplary flow chart of migrating to multiple topology transparent zones in the system of FIG. 1.

FIG. 6A is an exemplary flow chart of migrating to multiple topology transparent zones in the system of FIG. 1. The flow chart in FIG. 6A will be described with reference to FIGS. 6B and 6C, which illustrate exemplary embodiments of virtual links formed between multiple topology transparent zones in the system of FIG. 1 during migration of multiple parts in a network to multiple TTZs. To migrate multiple parts (e.g., the original internal topology 160 and the original internal topology 260 in the system of FIG. 1) to multiple TTZs (e.g., TTZ 160 and TTZ 260) concurrently or at the same time, the common edge node 161 may generate and distribute LSAs for multiple TTZs (e.g., TTZ 160 and TTZ 260) at the same time to a node outside of the TTZs. Before migration from multiple original internal topologies of clouds 160 and 260 to multiple TTZs, each of the original internal topologies may be viewed in detail by a node outside of the respective original internal topology. For example, for the original internal topology of cloud 160, before migration to a TTZ (e.g., TTZ 160), an external node (e.g., external node 115) outside of the original internal topology may view each node and link inside the original internal topology. However, after migration from multiple original multiple topologies to multiple TTZs, the original internal topology is hidden or concealed from each node outside of the respective cloud. For example, after migration from the original internal topology of cloud 160 and the original internal topology of cloud 260 into TTZ 160 and TTZ 260, respectively, the internal topology of 160 and the internal topology of 260 are hidden or concealed from the external nodes (e.g., external node 115). The internal topology of each of clouds 160 and 260 is also hidden or concealed from nodes outside of a respective cloud. For example, the internal topology of cloud 160 is hidden from each node (e.g., node 191) in cloud 260. On the other hand, node outside of the TTZs may view the virtualized topology of multiple TTZs (e.g., TTZ 160 and TTZ 260). For example, from the perspective of external nodes after migration, such as external node 115, the virtualized topology for multiple TTZs such as TTZ 160 and TTZ 260, are viewable. That is, the external node may view common edge node 161 connected to node 163 via link L1, to node 165 via link L2, to node 181 via link L4, to node 183 via link L5 and to node 115 via link L3 as illustrated in FIG. 6C.

Figure 6B:
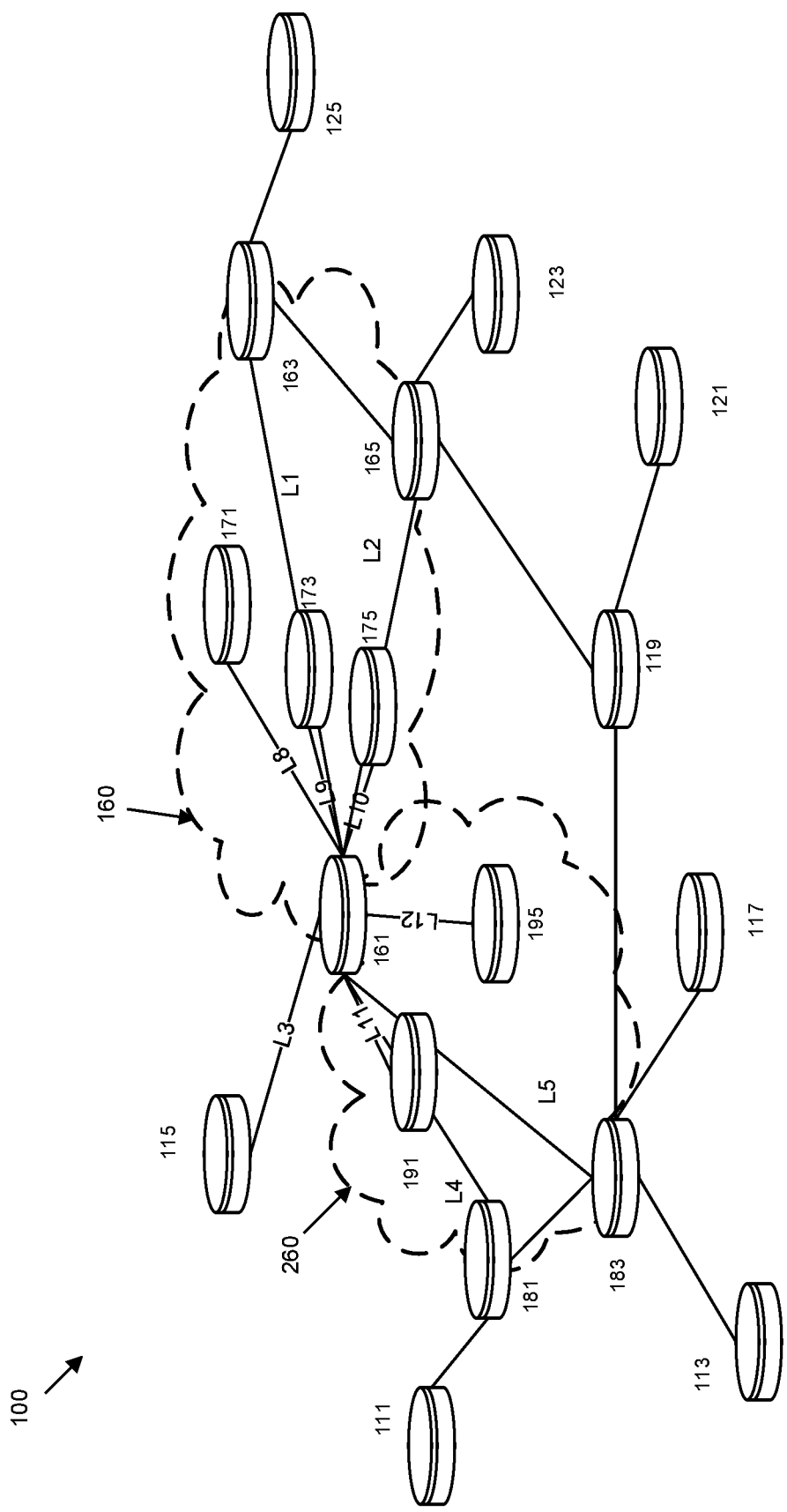
FIG. 6B illustrates exemplary embodiments of virtual links formed in multiple topology transparent zones in accordance with FIG. 6A.
Figure 6C:
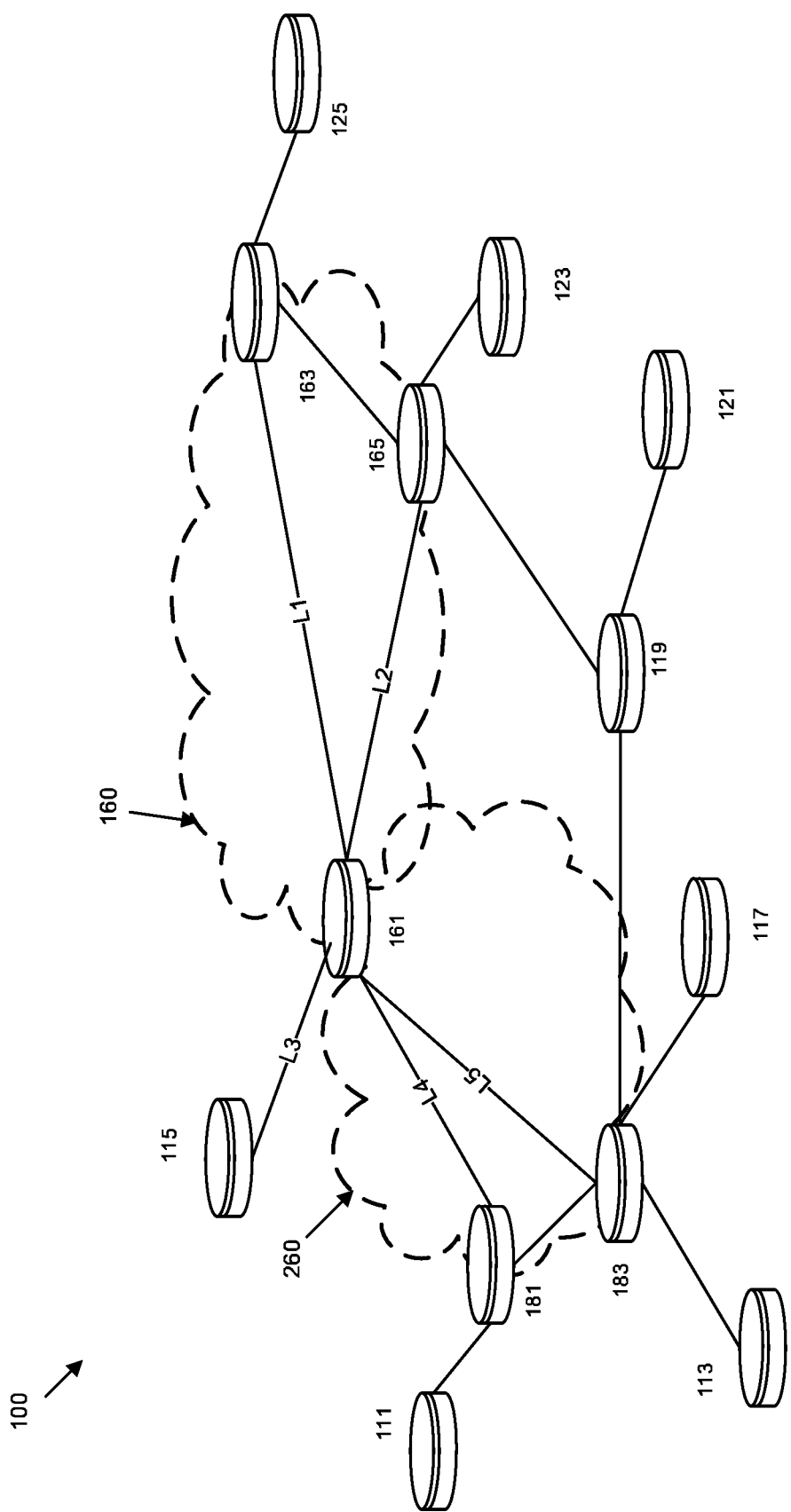
FIG. 6C illustrates exemplary embodiments of virtual links formed in multiple topology transparent zones in accordance with FIG. 6A.

At 602, and with reference to FIG. 6B, the common edge node 161 generates a first LSA for TTZ 160 and TTZ 260 that describes a link (virtual path) to each edge node in the TTZs having a neighboring external node and a link to each internal node in the TTZs directly connected to common edge node 161. For example, the common edge node 161 generates the first LSA containing four virtual paths L1, L2, L4 and L5. In addition, the first LSA comprises links L8, L9 and L10 for the internal links to internal nodes 171, 173 and 175 respectively, and links L11 and L12 for the internal links to internal nodes 191 and 193 respectively. Additionally, the first LSA includes link L3 between external node 115 and common edge node 161. The first LSA is then generated and distributed to TTZ 160, TTZ 260 and neighboring external nodes at 604. The first LSA describes links from common edge node 161 as: link to internal node 171 (L8), link to internal node 173 (L9), link to internal node 175 (L10), link to internal node 191 (L11), link to internal node 193 (L12), P2P link to edge node 181 (L4), P2P link to edge node 183 (L5), P2P link to edge node 163 (L1), P2P link to edge node 165 (L2) and link to external node 115 (L3).

Common edge node 161 generates a second LSA describing a link from the common edge node 161 to each of the edge nodes in TTZ 160 and TTZ 260 (FIG. 6C), at 606 and 608. A full description of the generation of the virtual paths and links may be found above with respect to FIGS. 2 and 4A, and will not be repeated herein. The second LSA describes links from common edge node 161 as: P2P link to edge node 181 (L4), P2P link to edge node 183 (L5), P2P link to edge node 163 (L1), P2P link to edge node 165 (L2) and link to external node 115 (L3). Once the LSAs have been distributed, the virtual topology for migrating to the TTZs (TTZ 160 and TTZ 260) is complete. As a result, external nodes outside of the migrated TTZs may view the topology of the migrated TTZs as depicted in FIG. 6C. At the same time, a third LSA for a TTZ is generated and distributed into the TTZ by a common edge node (e.g., node 161), at 610 and 612. The third LSA generated by common edge node 161 for the TTZ (e.g., TTZ 160) comprises the internal links in the TTZ directly connected to common edge node 161, the virtual links to edge nodes in the other TTZs (e.g., TTZ 260) and the links to external nodes directly connected to common edge node 161. For example, the third LSA generated by common edge node 161 for TTZ 160 comprises internal links L8, L9 and L10 to the internal nodes 171, 173 and 175 in TTZ 160 respectively, virtual link L4 and L5 to edge nodes 181 and 183 of TTZ 260 respectively, and link L3 to external node 115. Similarly, the third LSA generated by common edge node 161 for TTZ 260 comprises internal links L1 and L12 to the internal nodes 191 and 195 in TTZ 260 respectively, virtual link L1 and L2 to edge nodes 163 and 165 of TTZ 160 respectively, and link L3 to external node 115. The second LSA and the third LSAs are optionally generated and distributed after a delay from when the first LSA is generated and distributed at 605. In one embodiment, the second LSA and the third LSAs are generated and distributed after a period of time has elapsed from when the first LSA is generated and distributed. In another embodiment, the second LSA and the third LSAs are generated and distributed after the first LSA by each edge node of the TTZs is received for a given period of time.

According to the described embodiments of the present disclosure, a process of virtualizing a topology is provided. The virtualization process is implemented by a node or router to support multiple topology transparent zones using a single node or router shared by the zones and each of the other edge nodes of the zones. Thus, certain aspects of the present disclosure may advantageously improve network availability, reduce costs of operation and maintenance of networks and to smooth migration to zones without service interruption, as described herein above and below.

Figure 7:
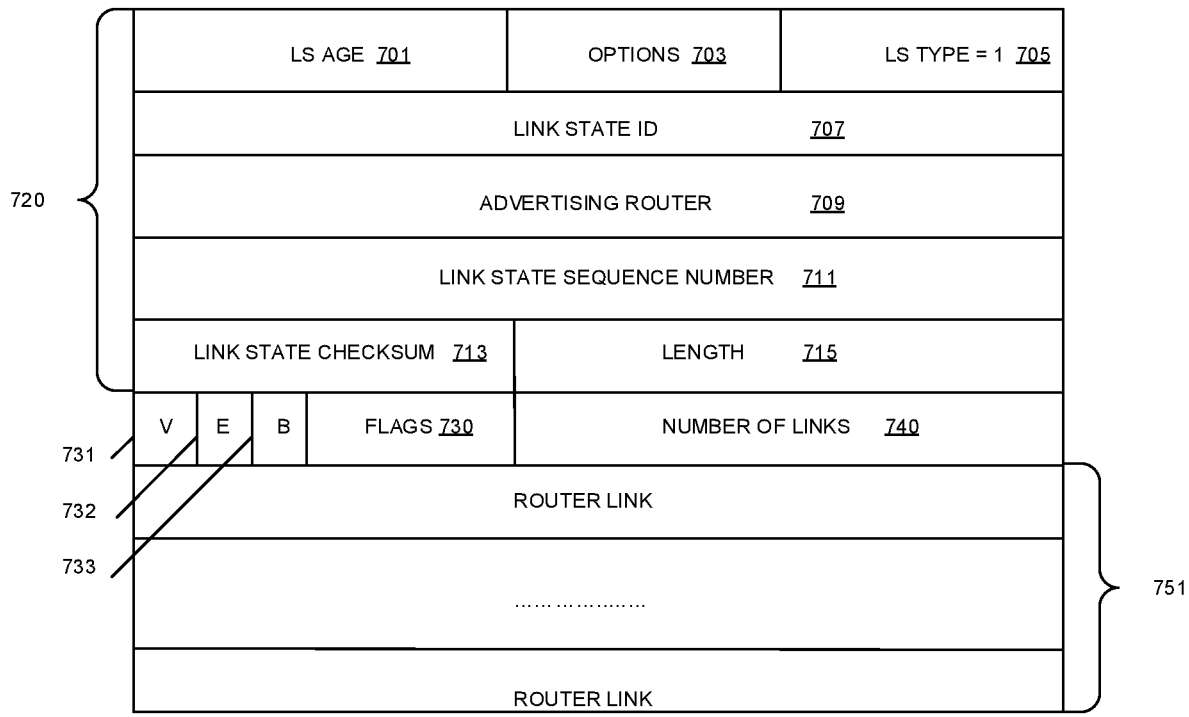
FIG. 7 illustrates an exemplary embodiment of a router LSA.

FIG. 7 illustrates an embodiment of a node or router LSA. The node or router LSA 700 (hereinafter "router LSA") includes a LSA header field 720, a Flags field 730, a Number of Links field 740, and a plurality of Router Link fields 751. The LSA header field 720 may include a link state (LS) Age field 701, an Options field 703, a LS-Type field 705, a Link State ID field 707, an Advertising Router field 709, a Link state Sequence Number field 711, a Link State Checksum field 713, and a Length field 715. In an embodiment, the LS Type field 705 may be set to a predetermined value (e.g., one) to indicate that the LSA 700 is a router LSA.

The Flags 730 may indicate the characteristics of a router that originates the LSA 700, and may comprise a virtual link (V) bit 731, an External (E) bit 732, and a Border (B) bit 733. The V bit 731 may be set to a predetermined value (e.g., one) to indicate that the source router is an endpoint of one or more fully adjacent virtual links. The E bit 732 may be set to a predetermined value (e.g., one) to indicate that the source router is an AS boundary router. The B bit 733 may be set to a predetermined value (e.g., one) to indicate that the source router is an ABR. The Number of Links field 740 may be a 16-bit number and may indicate the number of router links that are described in the Router Links fields 751. The Router Links fields 751 may comprise a Router Link field for each of the router links in the source router's area (e.g., the TTZ). Each Router Link field 751 may describe an individual router link in the TTZ (described further with reference to FIG. 9).

Figure 8:
FIG. 8 illustrates an exemplary embodiment of a link type.

FIG. 8 illustrates an embodiment of a link type. The link type 800 may be incorporated into a Router Link field 751 and include a bit flag 801 (denoted as a T bit flag) and a Type-1 field 803. The link type 800 may be an 8-bit octet, with the T bit flag 801 occupying one bit and the Type-1 field 803 occupying 7 bits. The T bit flag 801 may indicate whether the link is an internal link (i.e., a link inside a TTZ) or an external link (i.e., a link outside the TTZ), and the Type-1 field 803 may be set to predetermined values, such as one, two, three, or four, to indicate that the kind of link being described is a point-to-point (P2P) connection to another router, a connection to a transit network, a connection to a stub network, or a virtual link (respectively).

In one embodiment, the T bit flag 801 may be set to one to indicate that the link is an internal link in a TTZ, or to zero to indicate that the link is an external link. Alternatively, in another alternative embodiment, the T bit flag 801 may be set to zero to indicate that the link is an internal link in a TTZ, or to one to indicate that the link is an external link. As another alternative, a new field for a TTZ ID may be added into a router link to indicate which TTZ the link belongs to. The new field may be set to zero to indicate that the corresponding link is a link connecting to a node outside of the TTZ, or to a non-zero value (e.g., a TTZ ID corresponding to a TTZ) to indicate that the link belongs to which TTZ. In another embodiment, the TTZ ID for a respective TTZ may be put into link state ID field 707 for a router LSA for the respective TTZ.

FIG. 9 illustrates an embodiment of a router LSA in which router links are identified. A router LSA 700 may be generated by an edge node (for example, common edge node 161 in FIG. 3) to virtualize zones (e.g., TTZs 160 and 260). In the router LSA 700, the Link State ID and the Advertising Router fields may be used to identify the common edge node 161, wherein the router LSA is generated. With reference to FIG. 3 as an exemplary embodiment, the common edge node 161 is connected to the external node 115 via an external link, to each of the edge nodes 163 and 165 of TTZ 160 via a virtual path, to each of the edge nodes 181 and 183 of TTZ 260 via another virtual path, five Router Link fields may be used to indicate all links associated with the common edge node 161 to virtualize the TTZs 160 and 260. Further, in the Router Link fields, the T bit flag may be set to zero for each link since each virtual path is not an internal link. From the perspective of a node outside of the TTZs, the router LSA is a normal router LSA and the links in the LSA are normal links. Thus a node outside of the TTZs is not aware of any TTZs.

Figure 10:
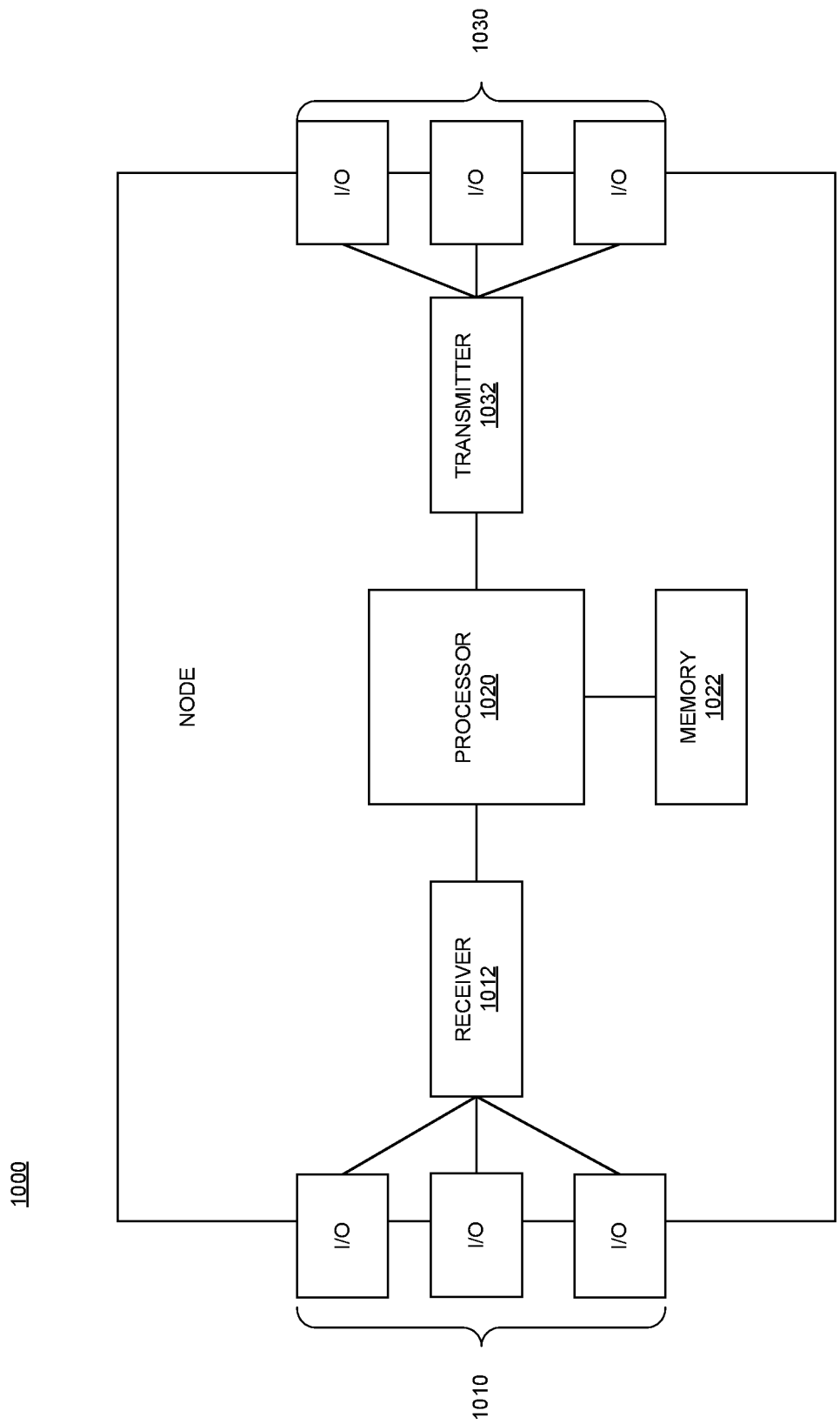
FIG. 10 illustrates an exemplary embodiment of a node or a router.

FIG. 10 illustrates an embodiment of a router. The node (e.g., a router) 1000 may be, for example, common edge node 161 (FIG. 3) or any other node or router as described above in network system 100. The node 1000 may comprise a plurality of input/output ports 1010/1030 and/or receivers (Rx) 1012 and transmitters (Tx) 1032 for receiving and transmitting data from other nodes, a processor 1020 to process data and determine which node to send the data to and a memory. The node 1000 may also generate and distribute LSAs to describe the various topologies associated within a TTZ and/or area of the network system. Although illustrated as a single processor, the processor 1020 is not so limited and may comprise multiple processors. The processor 1020 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1020 may be configured to implement any of the schemes described herein, such as the processes illustrated in FIGS. 2, 4A, 5A and 6A, using any one or combination of steps described in the embodiments. Moreover, the processor 1020 may be implemented using hardware, software, or both. The memory 1022 may be configured to store routing tables, forwarding tables, or other tables or information disclosed herein. Although illustrated as a single memory, memory 1022 may be implemented as a combination of read only memory (ROM), random access memory (RAM), or secondary storage (e.g., one or more disk drives or tape drives used for non-volatile storage of data).

Figure 11:
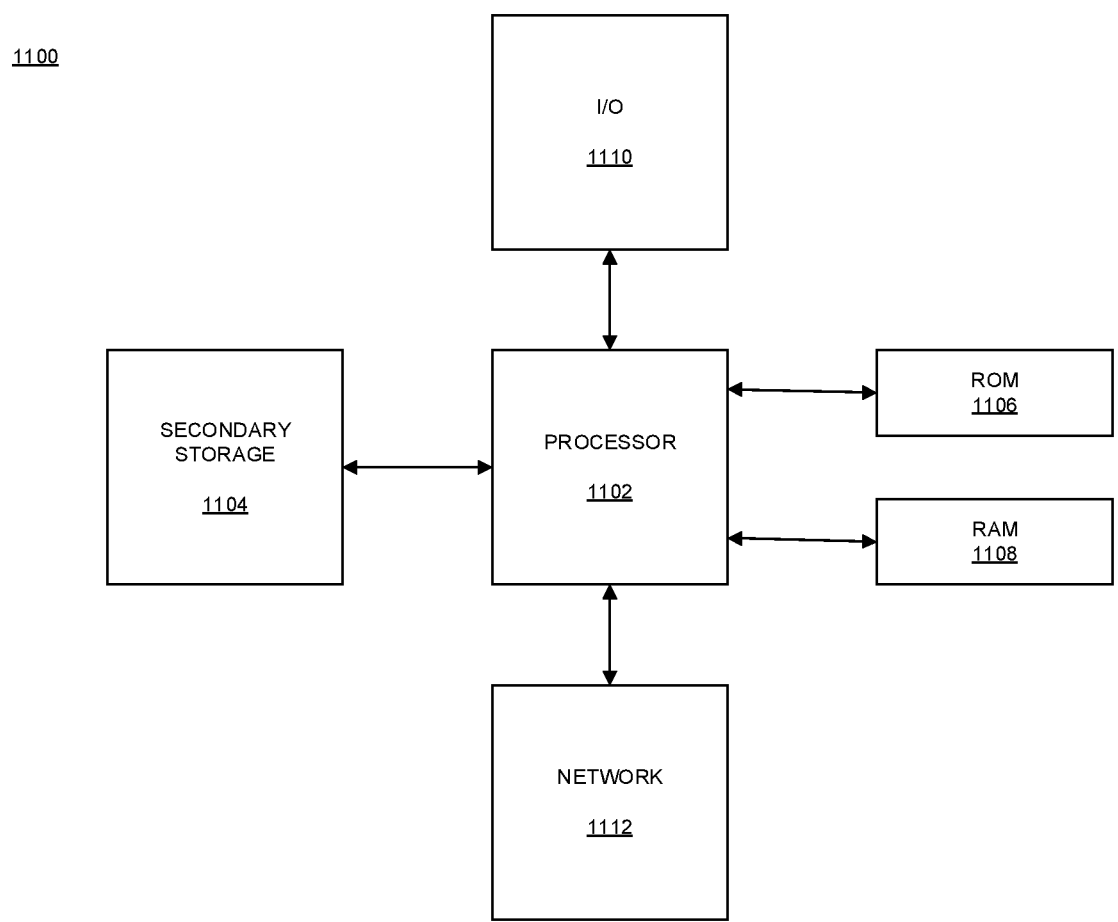
FIG. 11 illustrates a schematic diagram of a general-purpose network component or computer system.

The schemes described above may be implemented on any general-purpose network component, such as a computer or network component with sufficient processing power, memory resources, and network throughput capability to handle the necessary workload placed upon it. FIG. 11 illustrates a schematic diagram of a general-purpose network component or computer system. The general-purpose network component or computer system 1100 includes a processor 1102 (which may be referred to as a central processor unit or CPU) that is in communication with memory devices including secondary storage 1104, and memory, such as ROM 1106 and RAM 1108, input/output (I/O) devices 1110, and a network 1112, such as the Internet or any other well-known type of network, that may include network connectively devices, such as a network interface. Although illustrated as a single processor, the processor 1102 is not so limited and may comprise multiple processors. The processor 1102 may be implemented as one or more CPU chips, cores (e.g., a multi-core processor), FPGAs, ASICs, and/or DSPs, and/or may be part of one or more ASICs. The processor 1102 may be configured to implement any of the schemes described herein, including the processes described with reference to FIGS. 2, 4A, 5A and 6A. The processor 1102 may be implemented using hardware, software, or both.

The secondary storage 1104 is typically comprised of one or more disk drives or tape drives and is used for non-volatile storage of data and as an over-flow data storage device if the RAM 1108 is not large enough to hold all working data. The secondary storage 1104 may be used to store programs that are loaded into the RAM 1108 when such programs are selected for execution. The ROM 1106 is used to store instructions and perhaps data that are read during program execution. The ROM 1106 is a non-volatile memory device that typically has a small memory capacity relative to the larger memory capacity of the secondary storage 1104. The RAM 1108 is used to store volatile data and perhaps to store instructions. Access to both the ROM 1106 and the RAM 1108 is typically faster than to the secondary storage 1104. At least one of the secondary storage 1104 or RAM 1108 may be configured to store routing tables, forwarding tables, or other tables or information disclosed herein.

It is understood that by programming and/or loading executable instructions onto the node 1000, at least one of the processor 1020 or the memory 1022 are changed, transforming the node 1000 in part into a particular machine or apparatus, e.g., a router, having the novel functionality taught by the present disclosure. Similarly, it is understood that by programming and/or loading executable instructions onto the node 1100, at least one of the processor 1102, the ROM 1106, and the RAM 1108 are changed, transforming the node 1100 in part into a particular machine or apparatus, e.g., a router, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network node coupled as an edge node for both a first topology transparent zone (TTZ) and a second TTZ in a network area, comprising:
   a non-transitory memory storage comprising instructions;
   one or more processors in communication with the memory, wherein the one or more processors execute the instructions to:
      generate a first link state advertisement (LSA) including a description of a first link between the network node and an external node that is external to the first and the second TTZs; and
      generate a second LSA including the description of the first link and description of a second link between the network node and an internal node of the second TTZ; and
   a transmitter configured to transmit the first LSA to the external node and the second LSA to the internal node of the second TTZ.

2. The network node of claim 1, wherein the first LSA does not include the description of the second link.

3. The network node of claim 2, wherein the first LSA further includes description of a third link between the network node and a first edge node of the first TTZ, and description of a fourth link between the network node and a second edge node of the first TTZ.

4. The network node of claim 1, wherein the second LSA further includes description of a third link between the network node and a first edge node of the first TTZ.

5. The network node of claim 4, wherein the second LSA does not include description of a fifth link between the network node and an internal node of the first TTZ.

6. The network node of claim 1, wherein the one or more processors execute the instructions further to generate a third LSA, wherein the third LSA comprise the description of the first link, description of a fourth link and description of a fifth link, the fourth link is between the network node and a second edge node of the first TTZ, the fifth link is between the network node and an internal node of the first TTZ; and
   the transmitter is further configured to transmit the third LSA to the internal node of the first TTZ.

7. The network node of claim 6, wherein the third LSA does not include the description of the second link.

8. The network node of claim 1, wherein
   the description of the first link in the second LSA comprises a bit flag indicating the first link is external to the second TTZ, and the description of the second link in the second LSA comprises a bit flag indicating the second link is external to the second TTZ.

9. A method performed by a network node coupled as an edge node for both a first topology transparent zone (TTZ) and a second TTZ in a network area, the method comprising:
   generating a first link state advertisement (LSA) including description of a first link between the network node and an external node that is external to the first and the second TTZs;
   generating a second LSA including the description of the first link and description of a second link between the network node and an internal node of the second TTZ;
   transmitting the first LSA to the external node; and
   transmitting the second LSA to the internal node of the second TTZ.

10. The method of claim 9, wherein the first LSA does not include the description of the second link.

11. The method of claim 10, wherein the first LSA further includes description of a third link between the network node and a first edge node of the first TTZ, and description of a fourth link between the network node and a second edge node of the first TTZ.

12. The method of claim 9, wherein the second LSA further includes description of a third link between the network node and a first edge node of the first TTZ.

13. The method of claim 12, wherein the second LSA does not include description of a fifth link between the network node and an internal node of the first TTZ.

14. The method of claim 9, further comprising:
   generating a third LSA, wherein the third LSA comprise the description of the first link, description of a fourth link and description of a fifth link, the fourth link is between the network node and a second edge node of the first TTZ, the fifth link is between the network node and an internal node of the first TTZ; and
   transmitting the third LSA to the internal node of the first TTZ.

15. The method of claim 14, wherein the third LSA does not include the description of the second link.

16. The method of claim 9, wherein
   the description of the first link in the second LSA comprises a bit flag indicating the first link is external to the second TTZ, and the description of the second link in the second LSA comprises a bit flag indicating the second link is external to the second TTZ.

17. A network node coupled as an edge node for both a first topology transparent zone (TTZ) and a second TTZ in a network area, comprising:
   a non-transitory memory storage comprising instructions; and
   one or more processors in communication with the memory, wherein the one or more processors execute the instructions to generate a plurality of link state advertisements (LSAs) having different link descriptions; and
   a transmitter configured to selectively transmit each of the plurality of LSAs;
   wherein the plurality of LSAs includes a first LSA a second LSA that is different from the first LSA, and a third LSA that is different from both the first and second LSAs, and
   wherein the one or more processors execute the instructions to determine to transmit the first LSA to a node that is external to the first and second TTZs, transmit the second LSA to an internal node of the second TTZ, and transmit the third LSA to an internal node of the first TTZ.

18. The network node of claim 17, wherein the first LSA does not include description of a second link between the network node and the internal node of the second TTZ, and description of a fifth link between the network node and the internal node of the first TTZ.

19. The network node of claim 17, wherein the second LSA does not include description of a fifth link between the network node and the internal node of the first TTZ.

20. The network node of claim 17, wherein the third LSA does not include description of a second link between the network node and the internal node of the second TTZ.

21. The network node of claim 17, wherein the first LSA includes description of a first link between the network node and an external node that is external to the first and the second TTZs, description of a third link between the network node and a first edge node of the first TTZ, and description of a fourth link between the network node and a second edge node of the first TTZ.

22. The network node of claim 17, wherein the second LSA including description of a first link between the network node and an external node that is external to the first and the second TTZs, description of a second link between the network node and the internal node of the second TTZ, and description of a third link between the network node and a first edge node of the first TTZ.

23. The network node of claim 17, wherein the third LSA including description of a first link between the network node and an external node that is external to the first and the second TTZs, description of a fifth link between the network node and the internal node of the first TTZ, and description of a fourth link between the network node and a second edge node of the second TTZ.

\* \* \* \* \*